United States Patent
Kim

(10) Patent No.: US 8,549,568 B2
(45) Date of Patent: Oct. 1, 2013

(54) DIGITAL CONTENT PROCESSING APPARATUS AND METHOD OF DIGITAL VIDEO RECEIVER

(75) Inventor: Si Heung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 357 days.

(21) Appl. No.: 12/911,305

(22) Filed: Oct. 25, 2010

(65) Prior Publication Data

US 2011/0099592 A1  Apr. 28, 2011

(30) Foreign Application Priority Data

Oct. 23, 2009 (KR) .......... 10-2009-0101041

(51) Int. Cl.
  *H04N 7/173* (2011.01)
(52) U.S. Cl.
  USPC .......... 725/88; 725/90; 725/84; 725/102
(58) Field of Classification Search
  USPC .......... 725/88, 90, 94, 102
  See application file for complete search history.

(56) References Cited

U.S. PATENT DOCUMENTS

| | | | |
|---|---|---|---|
| 2004/0187160 A1* | 9/2004 | Cook et al. | 725/94 |
| 2004/0268397 A1* | 12/2004 | Dunbar et al. | 725/88 |
| 2006/0117357 A1 | 6/2006 | Surline | |
| 2006/0136981 A1 | 6/2006 | Loukianov | |

FOREIGN PATENT DOCUMENTS

| | | |
|---|---|---|
| EP | 1 309 195 | 5/2003 |
| WO | WO 99/62251 | 12/1999 |
| WO | WO 2006/114761 | 11/2006 |

* cited by examiner

*Primary Examiner* — Pankaj Kumar
*Assistant Examiner* — Charles N Hicks
(74) *Attorney, Agent, or Firm* — The Farrell Law Firm, P.C.

(57) ABSTRACT

A digital content processing apparatus and method of a digital video receiver is provided for controlling playback speed of digital content. The method includes receiving content data from a content provision server; buffering the received content data; demultiplexing the buffered content data to extract video data; indexing GOPs including specific frames in the content data; storing running times and file sizes of the GOPs as index data; demultiplexing the stored content data to extract the video data, when a request for a multiple speed playback is input; and decoding the GOPs corresponding to the multiple speed playback in the extracted video data by referencing the index data.

13 Claims, 4 Drawing Sheets

DIGITAL CONTENT PROCESSING APPARATUS AND METHOD OF DIGITAL VIDEO RECEIVER

PRIORITY

This application claims priority under 35 U.S.C. §119(a) to Korean Patent Application No. 10-2009-0101041, which was filed in the Korean Intellectual Property Office on Oct. 23, 2009, the disclosure of which is incorporated herein in its entirety by reference.

BACKGROUND OF THE INVENTION

1. Field of the Invention

The present invention relates generally to a digital video receiver and, in particular, to a digital content processing apparatus and method of the digital video receiver that is capable of controlling a playback speed of the digital content.

2. Description of the Related Art

Streaming content is constantly received by and presented to an end user while being delivered by a streaming content provision server. Accordingly, a client or a plug-in starts playback without waiting for all of the content to be completely downloaded. As a result, the streaming method is advantageous in its quick playback startup and small storage space requirement. In order to seamlessly play the streaming content, the client has to collect the streaming data such that the data can be continuously provided to the audio and video application programs. When the streaming data is received at relatively high data rate, the client buffers the streaming data and regulates the output data rate. However, when the streaming data is received at relatively low data rate, for example, due to a bad network condition or problem with the client device, the data is played abnormally.

A Video On Demand (VOD) system provides subscribers with Transport Stream (TS) packets using Real Time Transport Protocol (RTP) and Real Time Stream Protocol (RTSP). A digital video receiver stores the VOD content within an internal storage device and plays the VOD content in response to user's selection. In the VOD system, if the user requests a high speed playback of the VOD content, the server transmits the TS packets formatted in the high playback speed corresponding to that requested by the user. For example, the client device stores different playback speed-formatted data corresponding to the respective 2-speed, 3-speed, and 4-speed playback. However, this conventional playback speed control method has a drawback in that the playback quality is likely to be degraded due to the packet loss and jitter caused by the bad network quality, and if no corresponding playback speed-formatted data exists, a specific speed playback cannot be supported.

SUMMARY OF THE INVENTION

The present invention is designed to solve at least the above-described problems of the prior art. Accordingly, as aspect of the present invention is to provide a digital content processing apparatus and method for a digital video receiver for controlling playback speed of the digital content using index information.

In accordance with an aspect of the present invention, a content playback method of a digital video receiver includes receiving content data from a content provision server; buffering the received content data; demultiplexing the buffered content data to extract video data; indexing Groups Of Pictures (GOPs) including specific frames in the content data; storing running times and file sizes of the GOPs as index data; demultiplexing the stored content data to extract the video data, when a request for a multiple speed playback is input; and decoding the GOPs corresponding to the multiple speed playback in the separated video data by referencing the index data.

In accordance with another aspect of the present invention, a content playback apparatus of a digital video receiver includes a data communication unit that receives content data from a content provision server; a storage unit that stores the received content data; a first demultiplexer that demultiplexes the buffered content data to extract video data, indexes GOPs including specific frames in the content data, and stores running times and file sizes of the GOPs as index data; a second demultiplexer that demultiplexes the stored content data to extract the video data, when a request for a multiple speed playback is input; and a decoding unit that decodes the GOPs corresponding to the multiple speed playback in the separated video data by referencing the index data to display the content.

BRIEF DESCRIPTION OF THE DRAWINGS

The above and other aspects, features, and advantages of the present invention will be more apparent from the following detailed description in conjunction with the accompanying drawings, in which.

DETAILED DESCRIPTION OF EMBODIMENTS OF THE INVENTION

Various embodiments of the present invention are described in detail below with reference to the accompanying drawings. The same reference numbers are used throughout the drawings to refer to the same or like parts. Detailed description of well-known functions and structures incorporated herein may be omitted to avoid obscuring the subject matter of the present invention.

An embodiment of the present invention includes a system in which a content provider provides contents in the form of file, rather than streaming. Here, the file can be provided with File Transfer Protocol (FTP). Various embodiments of the present invention will be described for system in which VOD data is transmitted in the format of MPEG-TS, which is downloaded and stored in a storage medium of a Personal Video Recorder (PVR) set-top box, and then played in response to user's request. However, the present invention can be applied to all the types of digital video receivers that can download digital contents from a server providing the digital contents.

Figure 1:
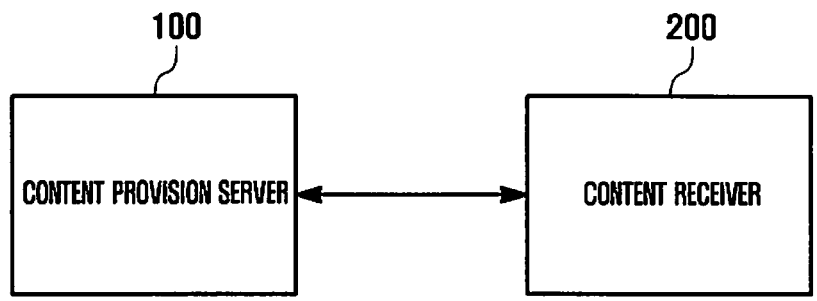
FIG. 1 is a schematic diagram illustrating a system according to an embodiment of the present invention.

FIG. 1 is a schematic diagram illustrating a system according to an embodiment of the present invention.

Referring to FIG. 1, the system includes a content provision server 100 for providing video content service and a content receiver 200 for downloading the contents provided by the content provision server 100. The content provision server 100 provides a normal speed playback data (i.e., 1-speed playback data) of the content, unlike a conventional content provision server that provides several different speed playback data.

The content includes video data and audio data, which are synchronized with each other. The video data includes a plurality of frames. The frames include an Intra-coded frame (I frame), a Bidirectional-coded frame (B frame), and a Predictive-coded frame (P frame). In the following description, data that includes the video and audio data that are synchronized with each other and include I, B, and P frames may be referred to as "content data".

The content receiver 200 receives the content data from the content server 100 in a range established by the network and performs indexing on the content data, which includes the I, B, and P frames. The content server 100 and the content receiver 200 communicate the digital contents in FTP such that the reception data rate of the content receiver 200 varies depending on the network condition. Accordingly, the content receiver 200 performs indexing on the data at high speed for the high reception data rate and at low speed for the low reception data rate.

In the indexing process, the running time of a frame is set virtually. For example, when a few hundred I frames are received per 1 second at the data rate of 50 Mbytes per 1 second, due to a good network condition, the content receiver 200, which knows the frame rate of the content, elongates the reception time by adding a virtual time (i.e., running time), based on the frame rate. Accordingly, the content receiver 200 can set the playback time (i.e. running time of the indexed video frames even when the reception data rate is low.

More specifically, the arrival time of the data input through the buffer 220 can vary according to network conditions. Accordingly, the arrival time of the first I frame is set as the reference time, and it is assumed that the frames are received at regular intervals after the first I frame to determine the relative running time. If the running time of the first I frame is known, the running times of the frames following the first I frame can be determined in relation with the known frame rate. The running time is determined as a virtual time according to a frame interval, without reference to arrival time. The content receiver determines a playback time referring the running time.

The term "indexing" means to mark information that can be referenced during a specific speed playback of the content. In accordance with an embodiment of the present invention, the indexed data can be grouped in units of Group Of Pictures (GOPs), where a GOP is a group of pictures including a specific frame (i.e., an I frame).

The indexing data can include a size and running time of the GOP. Accordingly, indexing can be performed in a unit of I frame. In order to record information about indexing during indexing process, index data is created.

Thereafter, if a high speed playback request is input by the user, the content receiver 200 performs playback of the content at the requested speed using the indexing data.

As described above, the content receiver 200 can perform indexing on a specific content according to a predetermined standard and plays the content at different playback speeds using the indices.

In accordance with an embodiment of the present invention, the content data includes video data including I, B, and P frames, and audio data is synchronized with the video data. The video playback time and the audio playback time may differ from each other at a specific playback speed. In this case the content receiver 200 can mute the sound output by decoding the audio data.

The I frame can be placed at any position of the video data and used for random access to the data. Particularly, the I frame is coded without referencing other pictures. Therefore, the I frame video data can be independently decoded, regardless of the other types of frame data. For example, JPEG data can belong to the I frame video data.

The P frame can be decoded using information of a previous I frame and P frame. The P frame is conceived in consideration of the fact that the contiguous images are not changed entirely, but that blocks of the images shift in a direction. That is, because the subject moves, when a movement occurs in a direction without changing the subject's shape, the difference value between the previous image and the current image is encoded.

The B frame is decoded using both the previous and next I and P frames. The compression rate can be increased by using the B frame. The B frame has a difference value between the previous I or P frame and the next I or P frame.

An indexing method according to an embodiment of the present invention sets an indexing interval in unit of GOP including one I frame in the digital video content including I, B, and P frames, and the indexing data of each indexing interval can include the playback times of individual frames of the GOP and size of the GOP.

Table 1 shows an exemplary index data structure generated according to an embodiment of the present invention.

TABLE 1

| | Frame Order | | | | | | | | | | |
|---|---|---|---|---|---|---|---|---|---|---|---|
| | 1 | 2 | 3 | 4 | 5 | 6 | 7 | 8 | 9 | 10 | 11 |
| video data | I | B | B | P | B | B | P | I | B | B | P |
| running time (h:m:s) | 00:00:01 | 00:00:03 | 00:00:05 | 00:00:07 | 00:00:09 | 00:00:11 | 00:00:13 | 00:00:15 | 00:00:17 | 00:00:19 | 00:00:21 |
| file size | | | | 1024 | | | | | | 384 | |

| | Frame Order | | | | | | | | | |
|---|---|---|---|---|---|---|---|---|---|---|
| | 12 | 13 | 14 | 15 | 16 | 17 | 18 | 19 | 20 | 21 |
| video data | B | B | P | I | B | B | P | I | B | B |
| running time (h:m:s) | 00:00:23 | 00:00:25 | 00:00:27 | 00:00:29 | 00:00:31 | 00:00:33 | 00:00:35 | 00:00:37 | 00:00:39 | 00:00:41 |
| file size | | 384 | | | 256 | | | | 125 | |

As shown in Table 1, a part of the video data includes 21 frames, i.e., frame 1 to frame 21, arranged in series, which are I, B, B, P, B, B, P, I, B, B, P, B, B, P, I, B, B, P, I, B, and B frames, respectively. Accordingly, the video data includes a plurality of frames. A specific type of frame can be repeated. The same type frame can be repeated with or without a pattern.

In Table 1, the frames are grouped into four GOPs, i.e., a first GOP including frames 1 to 7, a second GOP including frames 8 to 14, a third GOP including frames 15 to 18, and a fourth GOP including frames 19 to 21, and the numbers of frames of the GOPs are differ from each other.

Each frame has a running time for playback that does not change, even when the network and device conditions are changed. That is, the running time is the time corresponding to the normal playback speed (1-speed). Although it is assumed that the running time increments by 2 seconds in Table 1 for simplifying the explanation, the running time can be configured to increment by time smaller than 1 second. For example, if the frame rate is 1/30, 30 frames are played per 1 second. In this case, the running time of one frame is 1/30 second. Accordingly, the playback time has to change in a unit of 1/30 second. In Table 1, the file size of the GOP varies depending on the number of frames constituting the GOP and size of each frame.

In accordance with an embodiment of the present invention, content data can be indexed using an index of a specific frame, which repeatedly appears in the video data. Here, the specific frame can be an I frame, and the indexing data may include the running times of the frames belonging to the GOP starting with I frame and the file size of the GOP. Although each GOP includes the running times of individual frames, only the running time of the I frame can be included for the same effect. When the video frame data is structured as shown in Table 1, the index data can be formed as shown in Table 2.

TABLE 2

| Frame No. | 1 | 8 | 15 | 19 |
| --- | --- | --- | --- | --- |
| Number of Frames | 7 | 7 | 4 | 3 |
| Running time | 00:00:01 | 00:00:15 | 00:00:29 | 00:00:37 |
| File size | 1024 | 384 | 256 | 125 |

Referring to table 2, an embodiment of the present invention will be described below, wherein the I frame is set as an index.

As described above, when the digital content is downloaded from the content provision server 100, the content receiver 200 generates the index data along with the indices of the I frames of the digital content. When the I frames are set as indices, the index data includes the time points of all I frames and file size, until the next I frame is input. The arrival time of the data input through the buffer can vary according to network conditions. Accordingly, a relative time can be used, under an assumption that the first I frame is the reference time and the frame following the I frame arrives within a predetermined time interval.

Referring to Table 1, the $1^{st}$, $8^{th}$, $15^{th}$, and $19^{th}$ frames are I frames that are used as index frames. In Table 1, the index frames have respective running times of 00:00:01, 00:00:15, 00:00:29, and 00:00:37. The file sizes of the GOPs represented by the indices are 1024, 384, 256, and 125 Kbytes, respectively. The index data includes the running times of index frames and file sizes of the GOPs, each of which is defined between two index frames.

After performing indexing on the content data at normal playback speed, the content receiver 200 can play the content data at a high speed playback speed using the index data. For example, if a user request for 2-speed playback is input, the content receiver 200 sequentially decodes the frames of the GOPs including the $8^{th}$ and $19^{th}$ I frames among the $1^{st}$, $8^{th}$, $15^{th}$, and $19^{th}$ I frames to play the content data at the 2-speed, while skipping the $1^{st}$ and $15^{th}$ I frames. The content receiver 200 can retrieve the running times of the $8^{th}$ and $19^{th}$ I frames for decoding. That is, the content receiver 200 can retrieve the running times of 00:00:15 and 00:00:37 of every second I frames from the index data and then decode the frames included in the GOPs represented by the every second I frames.

Other speed playbacks of the content data can be done in the same manner as the 2-speed playback. For example, if a user request for 3-speed playback is input, the content receiver 200 decodes only the frames included in the GOPs indexed by every third I frames, i.e., the $15^{th}$ I frame from among the $1^{st}$, $8^{th}$, $15^{th}$, and $19^{th}$ I frames.

Figure 2:
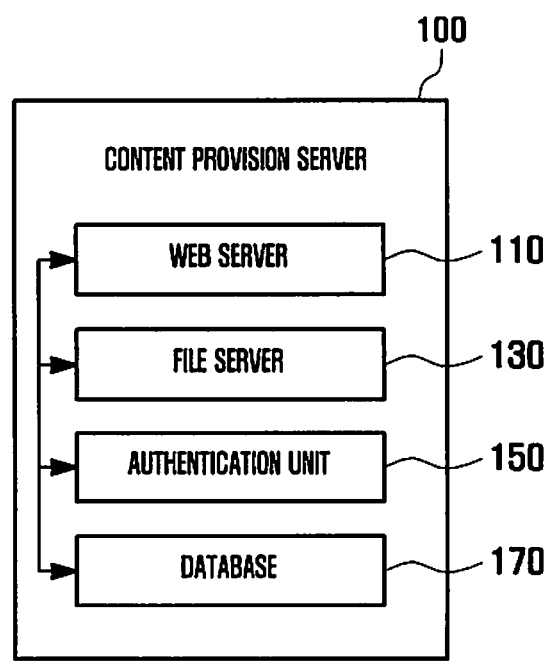
FIG. 2 is a block diagram illustrating a content server according to an embodiment of the present invention.

FIG. 2 is a block diagram illustrating a content server according to an embodiment of the present invention.

Referring to FIG. 2, the content provision server 100 includes a web server 110, a file server 130, an authentication unit 150, and a database 170.

The web server 110 provides information about the contents. The user can receive the information about the contents by accessing the web server 110. The web server 110 can provide a User Interface (UI) for providing the user with the information about the contents. The UI presents the information about the contents such that, when the user selects content using the content receiver 200, the file server 130 provides the data of the selected content. For example, the UI can be a webpage and can be designed in various formats.

The file server 130 transmits the content data to the content receiver 200. Specifically, the file server 130 retrieves the content data from the database 170 and transmits the retrieved content data to the content receiver 200.

The authentication unit 150 authenticates the subscription right of the user for the content. In order to download a specific content, a subscription right for the content is required, and thus the user has to purchase the right to download the content. Pay content is an example of such content.

More specifically, content data can be scrambled with a specific sequence. Accordingly, in order to descramble the content data, the sequence used for scrambling the content data is required. The authentication unit 150 stores the information on the sequence as a key value. After verifying that the user has purchased the corresponding content, the authentication unit 150 provides the content receiver 100 of the user purchased the content with the key value. The content receiver 200 can descramble the content data using the key value and play the content normally. The contents can be protected with various other authentication management methods as well.

Authentication management methods include Digital Right Management (DRM) and Conditional Access System (CAS).

The database 170 stores the content data in a format of a Transport Stream (TS). TS data is 188-bytes long and carries the PID data of audio and video in mixed form. When the content is provided in streaming format, different playback speed data should be stored separately. In accordance with an embodiment of the present invention, the content is provided in the TS file format such that only the normal speed playback content data is stored.

Unlike the conventional streaming format requiring 1-speed to n-speed playback content data, only 1-speed playback content data is stored in the system according to an embodiment of the present invention.

According to an embodiment of the present invention, a content player of a digital video receiver for processing content data provided by a content provision server can include a data communication unit, a storage unit, a first demultiplexer, a second demultiplexer, and a decoder. The data communication unit receives the content data provided by the content provision server and the storage unit stores the received content data. The first demultiplexer demultiplexes the content data to extract video data, indexes the GOPs including specific frames in the video data, generates index data including the running times and file sizes GOPs, and stores the index data in the storage unit. The second demultiplexer demultiplexes the content data stored in the storage unit in response to a specific speed playback to extract the video data. The decoder selects the GOPs corresponding to the specific speed playback by referencing the index data and decodes the frames included in the selected GOPs to display the content on the display screen.

Herein, the specific frames are I frames, and the GOPs can include the B and P frames that can be played with the I frames. The index data can include the frame numbers and running times of the individual frames of each GOP and sizes of individual GOPs. The index data can include the frame numbers and running times of the I frames representing the respective GOPs and numbers of frames of the GOPs and file sizes of the GOPs.

The decoding unit is provided with a video decoder, an audio decoder, and input buffers corresponding to the video and audio decoders. The video decoder extracts video data, buffers the video data to the corresponding input buffer, and selects the GOPs corresponding to the requested playback speed in the buffered video data by referencing the index data. The GOPs are selected based on the I frame numbers such that the B and P frames contained GOPs are decoded as well as the I frames. When a specific speed playback is requested, the decoder can mute the sound output by decoding the audio data.

Figure 3:
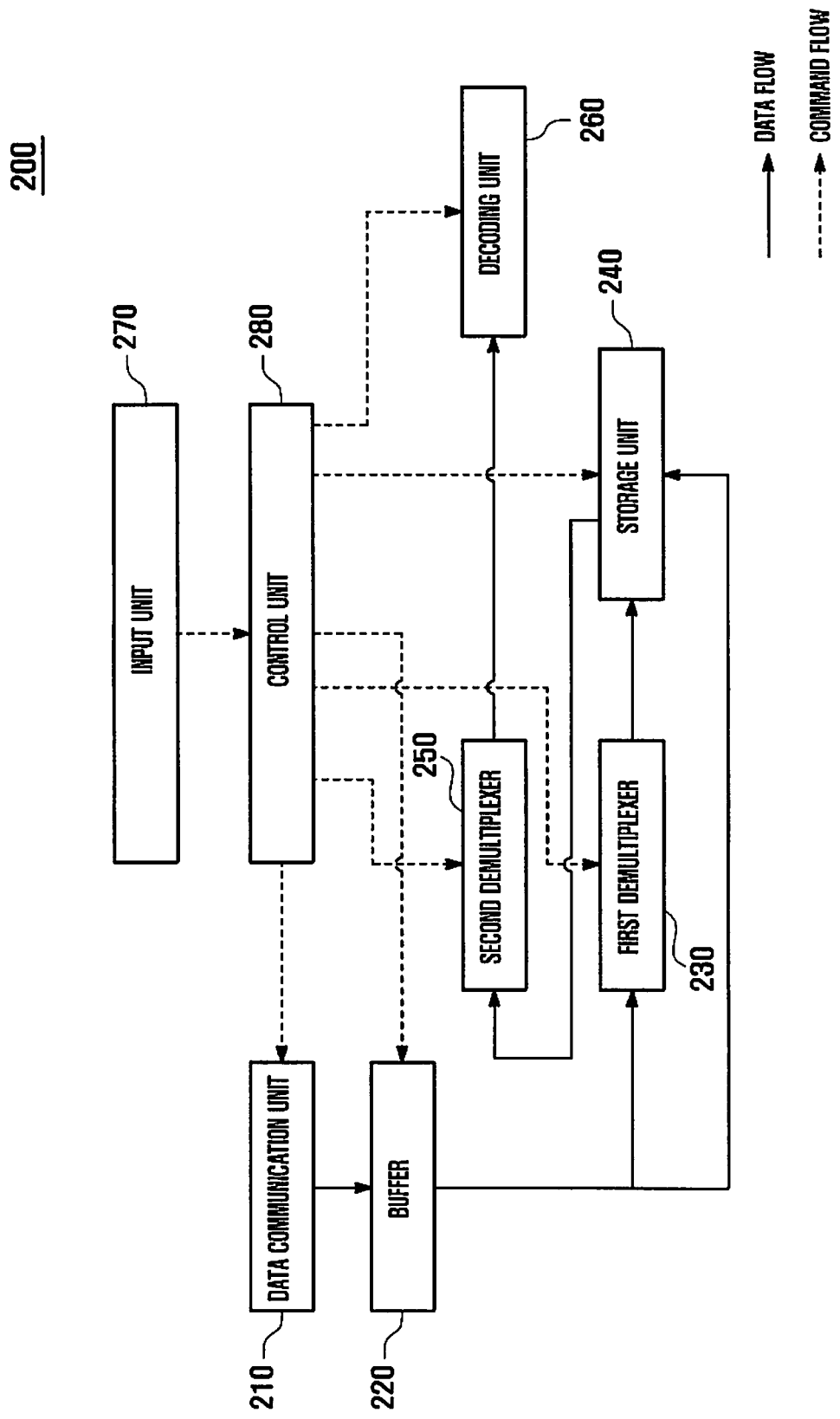
FIG. 3 is a block diagram illustrating a content receiver according to an embodiment of the present invention.

FIG. 3 is a block diagram illustrating a content receiver according to an embodiment of the present invention.

Referring to FIG. 3, the content receiver 200 includes a data communication unit 210, a buffer 220, a first demultiplexer 230, a storage unit 240, a second demultiplexer 250, a decoding unit 260, an input unit 270, and a control unit 280. For example, the content receiver 200 may be a set-top box, such as an inbuilt set-top box or an external set-top box. The content receiver is not limited to the set-top box but can be any of the devices that can receive and play the multimedia content.

The data communication unit 210 transmits a request message for requesting content to the web server 110, under the control of the control unit 280. Upon receipt of the request message, the file server 130 interoperating with the web server 110 retrieves the content data corresponding to the requested content from the database 170. As described above, the data is transmitted in FTP.

The data communication unit 210 receives the content data provided by the content provision server 100, and then buffers the received content data to the buffer 220. The content data provided by the content provision server 100 can be the TS data including the PID data, such as audio and video data in mixed form. The video data includes I frames, P frames, and B frames.

The buffer 220 buffers the content data including the I, B, and P frames of video data. If a predetermined amount of content data is accumulated, the buffer 220 outputs the content data to the first demultiplexer 230 and the storage unit 240. For example, the buffer 220 can be a semiconductor memory.

The first demultiplexer 230 performs demultiplexing on the content data output from the buffer 220 to separate the video data, distinguishes the I, B, and P frames, and performs indexing on the I frames. When setting the I frames with indices, the control unit generates index data including running times of I frames with which the GOPs start and file sizes of the GOPs as shown in Table 1. The arrival time of the data input through the buffer 220 can vary according to network conditions. Accordingly, the arrival time of the first I frame is set as the reference time, and it is assumed that the frames are received at a regular interval after the first I frame to determine the relative running time. If the running time of the first I frame is known, the running times of the frames following the first I frame can be determined in relation with the known frame rate. The first demultiplexer 230 generates the index data (running times and file sizes of GOPs) of I frames in the video data and sends the index data to the storage unit 240.

For example, the first demultiplexer 230 assigns indices to the I frames among the frames of the content data output from the buffer 220 in sequential order and then outputs the index data about the positions of the I frames of the content data. Next, the first demultiplexer 230 stores the content and index data in the storage unit 240. Because the content data is transmitted using FTP, the reception data rate is variable. In this case, the second demultiplexer 230 performs indexing on the data at high speed for the high reception data rate and at low speed for the low reception data rate. Accordingly, the first demultiplexer 230 can be implemented with two or more demultiplexing modules. In this case, one demultiplexing module is used for indexing the video frames received at normal frame rate, and the other multiplexing module is used to receive and perform indexing on the data received at the variable reception rate (particularly, when the frame rate is high).

The storage unit 240 stores the content output by the buffer 220 and the index data output by the first demultiplexer 230, and stores the content and index data corresponding to the content semi-permanently, and the content is not deleted after being provided to the second demultiplexer 240. The storage unit 240 can be a storage media such as Hard Disk Drive (HDD). The content stored in the storage unit 240 is content data identical with that provided by the content provision server 100. The storage unit 240 stores the content and the index data corresponding to the content, and thus, the number of index data corresponds with that of the stored content.

The second demultiplexer 250 demultiplexes the content data output by the storage unit 240 into video, audio, and broadcast data and outputs the demultiplexed data to the decoding unit 260. The content is stored in the storage unit 240 in TS packet format, and the TS packet stream is formed by multiplexing the video, audio, and broadcast data. The second demultiplexer 250 checks the identifiers of the TS packets and demultiplexes the content data into the video, audio, and broadcast data with the TS packet identifies.

The decoding unit 260 decodes the received content data and outputs the decoded content data. The decoding unit 260 can include a video decoder for decoding the demultiplexed video data, an audio decoder for decoding the demultiplexed audio data, and a data decoder for decoding the demultiplexed broadcast data. The decoding unit 260 can perform decoding to support a specific speed playback of the content data under the control of the control unit 280. For example, the decoding unit 260 can perform decoding at any of 1-speed to n-speed playbacks under the control of the control unit 280. The decoding unit 260 can be provided with buffers for buffering the respective video, audio, and broadcast data demultiplexed by the second demultiplexer 250.

Assuming that the content receiver 200 is a set-top box, which is built in a TV, the decoded content data can be played so as to be output through a directly connected display device (not shown) and audio device (not shown). Assuming that the content receiver 200 is an external set-top box, the decoded content data can be played so as to be output by means of an external device (not shown) such as TV connected through an external output link.

The input unit 270 is provided with a plurality of alphanumeric keys for inputting alphabetic and numeric data and functions keys for executing various functions. Particularly, the input unit 270 transfers the key signal input by the user in association with content request and specific speed playback to the control unit 280. When the content receiver 200 is a set-top box, the input unit 270 can be a remote controller.

The control unit 280 is responsible for controlling all the functions of the content receiver 200 and controls the data communication unit 210 to transmit a request message for requesting the intended content to the web server 100 in response to the user command input by means of the input unit 270. The control unit 280 also controls the content data to be output, when the content data is larger than a predetermined size. The control unit 280 controls the first demultiplexer 230 to index the content data according to a predetermined rule.

If a specific speed playback is requested by the user, the control unit 280 controls the storage unit 240 to output the content data to the second demultiplexer 250 in order to change the output positions of the content data according to the corresponding speed playback. That is, if a specific speed playback command in input through the input unit 270, the control unit 280 controls the second demultiplexer 250 and the decoding unit 260 by referencing the index data of the corresponding content stored in the storage unit 240 such that the content stored in the storage unit 240 is decoded to be played at the corresponding playback speed. For the requested speed playback, the second demultiplexer 250 demultiplexes the content stored in the storage unit 240 to separate the video data, and the control unit 280 selects the GOPs including the I frames for the playback speed control among the video data frames by referencing the index data and supplies the frames contained in the GOPs to the video decoder. That is, if the second demultiplexer 250 demultiplexes to output the content data, the control unit 280 controls the decoding unit 260 to decode the frames selected depending on the playback speed.

For 2-speed playback, the control unit 280 checks the I frames for the 2-speed playback, the running times of the I frames, and the file sizes of the GOPs including the corresponding I frames. Thereafter, the control unit 280 controls such that the video data of the every second GOPs (odd-numbered GOPs or even-numbered GOPs) among the video data demultiplexed by the second demultiplexer 250 are input to the video buffer of the decoding unit 260 according to the index data. The decoding unit 260 decodes the data from the video buffer to be played at the requested playback speed under the control of the control unit 280.

Similarly, for 3-speed playback, the control unit 280 checks the I frames for the 3-speed playback, the running times of the I frames, and the file sizes of the GOPs including the corresponding I frames. Thereafter, the control unit 280 controls such that the video data of the every third GOPs among the video data demultiplexed by the second demultiplexer 250 are input to the video buffer of the decoding unit 260 according to the index data. At a specific playback speed, the audio data may be played at different playback speed. In this case, the control unit 260 can control the decoding unit 260 to do not decode the audio data.

As described with reference to Tables 1 and 2, the digital content provision method according to an embodiment of the present invention indexes the received content data and decodes the content data by referencing the index data so as to control the playback speed of the digital content.

The content playback method of the digital video receiver according to an embodiment of the present invention includes receiving content data from a content provision server, storing the received content data, demultiplexing the stored content data to separate video data, indexing GOPs including specific frames in the separated video data, generating index data including running times and file sizes of the GOPs, demultiplexing, when a specific speed playback is requested, the stored content data to separate the video data, selecting the GOPs corresponding to the playback speed by referencing the index data, and decoding the frames contained in the selected GOPs to play at the requested playback speed.

Herein, the specific frames are Intra-coded frames (I frames), and each GOP can include the Bidirectional-coded frames (B frames) and Predictive-frames (P frames) that are decoded with the I frames. The index data can include the frame numbers of the video frames contained in the GOPs and the running times of file sizes of the GOPs. The index data also can include the frames numbers and running times of I frames included in the GOPs and the numbers of frames and file sizes of the GOPs.

The multiple speed playback procedure can include multiplexing the stored content data to separate video data in response to a multiple speed playback request, selecting video data of GOPs from the separated video data by referencing the index data according to the requested multiple speed playback, and decoding the selected video data to be played at the requested playback speed. Selecting the video data of GOPs for the requested playback speed can include buffering the separated video data, and selecting the GOPs corresponding to the requested playback speed from the buffered video data, and selecting the GOPs can include selecting I frame numbers of the GOPs and B and P frames corresponding to the I frame.

Figure 4:
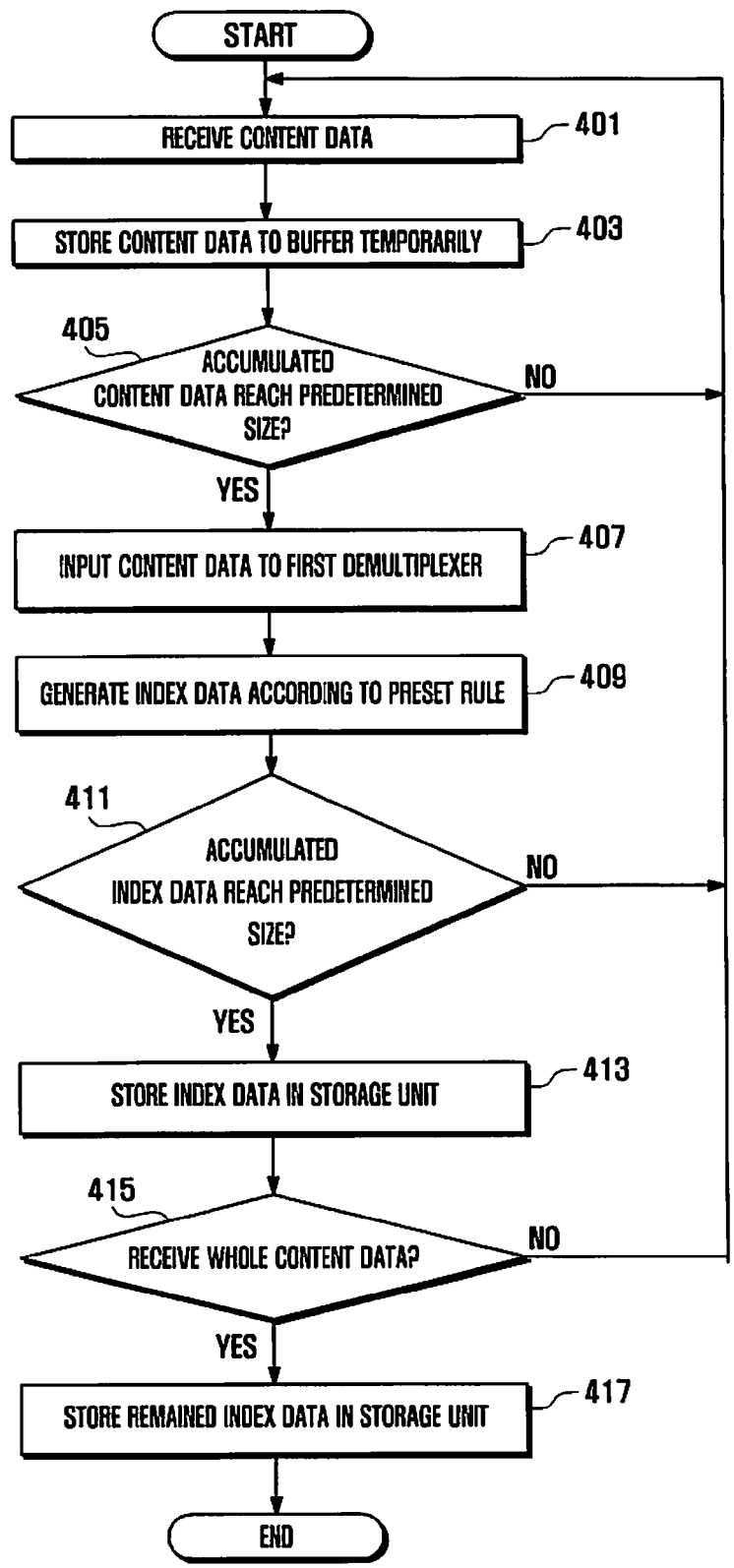
FIG. 4 is a flowchart illustrating a data indexing procedure of a digital content processing method according to an embodiment of the present invention.

FIG. 4 is a flowchart illustrating a data indexing procedure of a digital content processing method according to an embodiment of the present invention. It is assumed that the indexing method is preset such that every I frame is indexed as described with reference to Tables 1 and 2. For example, the indexing method can be set at the manufacturing stage of the content receiver 200 and can be configured by the user.

Referring to FIG. 4, the control unit 280 receives the content data through the data communication unit 210 in step 401 and temporarily stores the received data in the buffer 220 in step 403. The content data is transmitted by the content provision server 100 such that the download speed varies depending on network conditions. That is, the content receiver 200 can download the content data at a high data rate when the network condition is good and at a low data rate when the network condition is bad. The content receiver 200 downloads the content data at variable data rate by using the communication unit 210 and stores the received content data in the buffer 220.

Because indexing is performed in a unit of a data block, the control unit 280 monitors the size of the content data accumulated in the buffer, and determines whether the accumulated content data has reached a predetermined size in step 405. If the accumulated content data has reached a predetermined size, the control unit 280 controls to output the content data accumulated in the buffer 220 to the first demultiplexer 230 and the storage unit 240 in step 407. The storage unit 240 stores the contents data output from the buffer 220 under the control of the control unit 280.

In step 409, the control unit 280 controls the first demultiplexer 230 to generate index data in unit of GOP. That is, the first demultiplexer 230 demultiplexes the TS packet stream output from the buffer 220 to extract video data. The control unit 280 checks the I frames in the video data extracted from the TS packet stream and the running times of the I frames and file sizes of the GOPs including the I frames to generate the index data of the GOPs. Here, the frame running time is set in consideration of a number of frames because the content data is received at variable data rate. The control unit 280 creates a virtual frame running time by adding a predetermined time duration starting from the first frame to the time of each frame of the video data extracted by the first demultiplexer 230 and records the file size at that time as index information. Examples of the running time and file sizes are shown in Table 1.

Although the description is made under the assumption that the control unit 280 generates the index data in FIG. 4, the first demultiplexer 230 can also generate the index data. In this case, the first demultiplexer 230 demultiplexes the digital content data into video data, extracts I frames by referencing the identifiers of the video frame data, and creates the index data with the running times and file sizes of the corresponding GOPs.

Repeating the above operations, the control unit 280 determines whether the accumulated index data has reached a predetermined size in step 411. If the accumulated index data has reached to the predetermined size, the control unit 280 controls to output the index data to store in the storage unit 240 in step 413. The index data is stored in unit of a predetermined size to avoid unnecessarily frequent access to the storage that increases the system load. Accordingly, the control unit 280 determines whether the index data has reached a predetermined size in step 411, and the control unit 280 stores the index data in the storage unit 240 at step 413.

Because the indexing process continues until all of the content data is completely received, the control unit determines whether all of the content data has been completely received in step 415. If all of the content data has not been completely received, the control unit 280 repeats the procedure in step 401. However, if all of the content data has been completely received, the control unit 280 stores the remaining index data in the storage unit 240 in step 417, ending the procedure.

Figure 5:
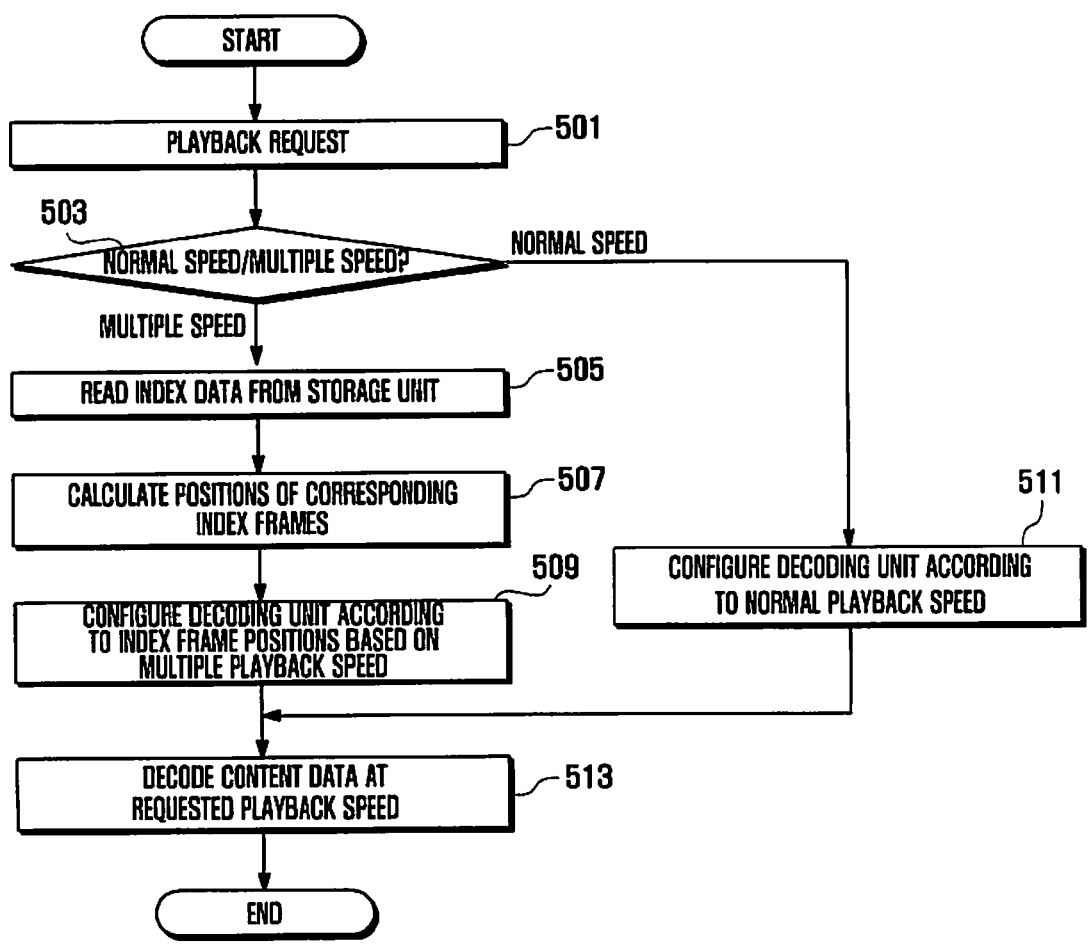
FIG. 5 is a flowchart illustrating a content data playback procedure of a digital content processing method according to an embodiment of the present invention.

FIG. 5 is a flowchart illustrating a content data playback procedure of a digital content processing method according to an embodiment of the present invention.

In FIG. 5, it is assumed that a content playback request is input by the user. The playback request can be a multiple speed playback request. Particularly, in the embodiment illustrated in FIG. 5, the high speed playback is performed right after starting storage of the index data, as illustrated in FIG. 4. That is, if the accumulated index data has reached a predetermined size for indexing the frames of which running times and file sizes are recorded at step 411 of FIG. 4 and then the index data are created according to a predetermined rule at step 413 of FIG. 4, it is possible to play the content at a high playback speed to the user using the index data.

Referring to FIG. 5, the control unit 501 detects a playback request input by the user in step 501. When a playback request is detected, the control unit 280 determines whether the playback request is a normal speed playback request or a multiple speed playback request in step 503. If the playback request is the multiple speed (i.e., equal to or faster than 2-speed) playback request, the control unit 280 reads out the index data from the storage unit 240 in step 505, calculates the positions of the corresponding index frames on the basis of time in step 507, and configures the second demultiplexer 250 and the decoding unit 260 to process the data based on the positions of the index frames in step 509. Thereafter, the content data is decoded to be played at the requested playback speed in step 513.

For example, for 2-speed playback, the control unit 280 checks the positions of I frames as the index frames of the content data stored in the storage unit 240 and controls the second demultiplexer 250 and the decoding unit 260 to process the every second I frames among the entire I frames. Similarly, for 3-speed playback, the control unit 280 controls the second demultiplexer 250 and the decoding unit 260 to process every third I frames among the entire I frames.

More specifically, if a multiple speed playback is requested for a specific content item, the control unit 280 checks the index data stored in the storage unit 240 in association with the content data and controls the second demultiplexer 250 to demultiplex the content data stored in the storage unit 240; the second demultiplexer 250 demultiplexes the content data into video, audio, and broadcast data and inputs the multiplexed data to the corresponding buffers of the decoding unit 260; and then the control unit 280 controls the video buffer by referencing the index data such that the data of I frames and related frames (B and P frames) are input to the video decoder.

As described above, the decoder 160 can include a video decoder, an audio decoder, and a data decoder, which can be provided with corresponding buffers. The video decoder of the decoding unit 260 decodes the video data processed for the multiple speed playback and outputs the decoded video data to a display unit (not shown) to be played at the multiple playback speed. In case of the multiple speed playback, the control unit 280 can controls the audio decoder of the decoding unit 260 to do not decoding the audio data. That is, the sound of the audio signal can be muted in multiple speed playback.

If the playback request is for the normal speed playback in step 503, the control unit 280 configures the decoding unit 260 to decode the data at normal playback speed in step 511. Accordingly, the decoding unit 260 decodes the video and audio data multiplexed by the second demultiplexer 250 at the normal playback speed.

As described above, a digital content processing apparatus and method of digital video receiver according to an embodiment of the present invention is capable of indexing specific frames of content data for controlling playback speed of the digital content downloaded in the form of VOD and playing the content data at various playback speeds using the index data. Also, the digital content processing apparatus and method according to an embodiment of the present invention advantageously starts playing the content without waiting for all of the content to be downloaded.

Although certain embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

What is claimed is:

1. A content playback method of a digital video receiver, comprising:
    receiving content data from a content provision server;
    buffering the received content data;
    demultiplexing the buffered content data to extract video data;
    indexing Groups Of Pictures (GOPs) including specific frames in the content data;
    storing running times and file sizes of the GOPs as index data;
    demultiplexing the stored content data to extract the video data, when a request for a multiple speed playback is input; and
    decoding the GOPs corresponding to the multiple speed playback in the extracted video data by referencing the index data.

2. The content playback method of claim 1, wherein the specific frames include Intra-coded frames, and the GOPs include Bidirectional-coded frames and Predictive-coded frames.

3. The content playback method of claim 2, wherein the index data includes frame numbers and running times of frames included in the GOPs and file sizes of the GOPs.

4. The content playback method of claim 2, wherein the index data includes frame numbers, running times of the Intra-coded frames, numbers of frames included in the GOPs, and file sizes of the GOPs.

5. The content playback method of claim 2, wherein decoding the GOPs comprises:
    separating the video data by multiplexing the stored content data, when the multiple speed playback is requested;
    selecting video data of the GOPs for the requested multiple speed playback by referencing the index data; and
    displaying the content by decoding the selected video data.

6. The content playback method of claim 5, wherein selecting the video data comprises:
    buffering the video data separated from the content data; and
    selecting the GOPs for the requested multiple speed playback,
    wherein selecting the GOPs includes selecting Intra-coded frame numbers of the corresponding GOPs and Bidirectional-coded frames, and Predictive-coded frames corresponding to the Intra-coded frames.

7. The content playback method of claim 6, wherein the multiple speed playback mutes sound of audio data.

8. A content playback apparatus of a digital video receiver, comprising:
    a data communication unit that receives content data from a content provision server;
    a storage unit that stores the received content data;
    a first demultiplexer that demultiplexes the buffered content data to extract video data, indexes Groups Of Pictures (GOPs) including specific frames in the content data, and stores running times and file sizes of the GOPs as index data;
    a second demultiplexer that demultiplexes the stored content data to extract the video data, when a request for a multiple speed playback is input; and
    a decoding unit that decodes the GOPs corresponding to the multiple speed playback in the extracted video data by referencing the index data to display the content.

9. The content playback apparatus of claim 8, wherein the specific frames include Intra-coded frames, and the GOPs include Bidirectional-coded frames and Predictive-coded frames.

10. The content playback apparatus of claim 9, wherein the index data comprises frame numbers and running times of frames included in the GOPs and file sizes of the GOPs.

11. The content playback apparatus of claim 9, wherein the index data comprises frame numbers and running times of the Intra-coded frames, and numbers of frames included in the GOPs, and file sizes of the GOPs.

12. The content playback apparatus of claim 9, wherein decoding unit comprises:
    a video decoder;
    an audio decoder; and input buffers corresponding to the video and audio decoders,
    wherein the video decoder buffers the video data extracted from the content data to a corresponding input buffer and selects GOPs for the requested multiple speed playback,
    wherein the video decoder selects the GOPs by selecting Intra-coded frame numbers of the corresponding GOPs and Bidirectional-coded frames, and Predictive-coded frames corresponding to the Intra-coded frames.

13. The content playback apparatus of claim 12, wherein the decoding unit mutes sound of audio data during the multiple speed playback.

* * * * *